United States Patent [19]
Whiting

[11] Patent Number: 5,560,823
[45] Date of Patent: Oct. 1, 1996

[54] REVERSIBLE FLOW SUPERCRITICAL REACTOR AND METHOD FOR OPERATING SAME

[75] Inventor: Philip Whiting, Milton, Canada

[73] Assignee: Abitibi-Price, Inc., Mississauga, Canada

[21] Appl. No.: 361,126

[22] Filed: Dec. 21, 1994

[51] Int. Cl.$^6$ ..................................................... C02F 1/72
[52] U.S. Cl. ........................ 210/205; 210/175; 422/197; 422/202
[58] Field of Search .................................. 210/762, 763, 210/761, 198.1, 175, 205; 422/197, 202

[56] References Cited

U.S. PATENT DOCUMENTS

| | | | |
|---|---|---|---|
| 2,665,249 | 1/1954 | Zimmermann | 210/2 |
| 2,944,396 | 7/1960 | Barton et al. | 60/39.05 |
| 4,292,953 | 10/1981 | Dickinson | 126/263 |
| 4,338,199 | 11/1988 | Modell | 210/721 |
| 4,543,190 | 9/1985 | Modell | 210/721 |
| 4,822,497 | 4/1989 | Hong et al. | 210/721 |
| 5,100,560 | 3/1992 | Huang | 210/721 |
| 5,252,224 | 10/1993 | Modell et al. | 210/695 |

*Primary Examiner*—Neil McCarthy
*Attorney, Agent, or Firm*—Hoffmann & Baron

[57] ABSTRACT

A supercritical water oxidation reactor is described having first and second reaction zones connnected in series and through which an aqueous feed stream to be oxidized can be passed in either direction. A self-contained heat exchange fluid system allows supercritical and subcritical temperatures to be maintained in either reaction zone. When supercritical water oxidation is occuring in one reaction zone the effluent is being cooled to a subcritical temperature and used to flush the second reaction zone to remove inorganic scale.

4 Claims, 4 Drawing Sheets

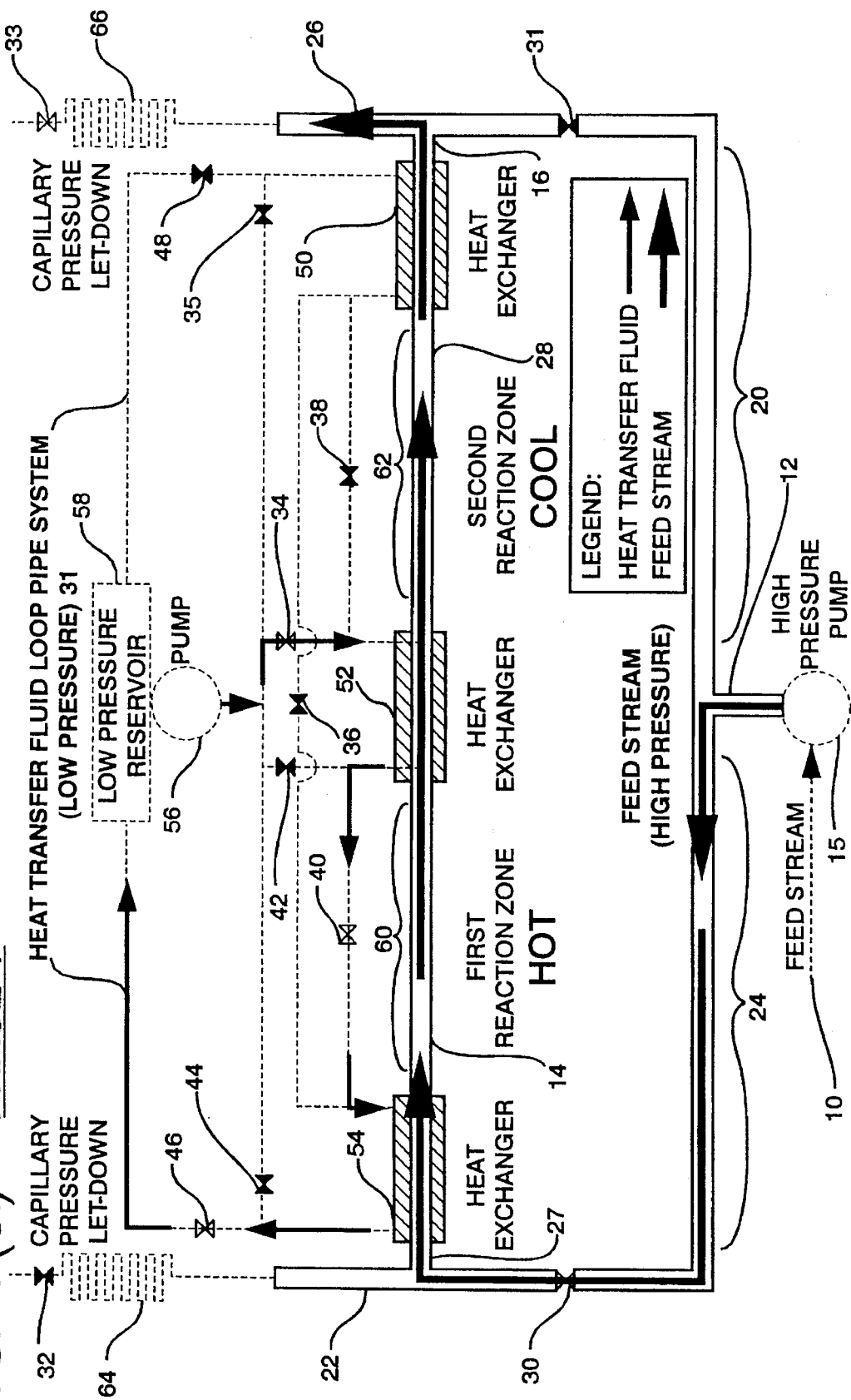

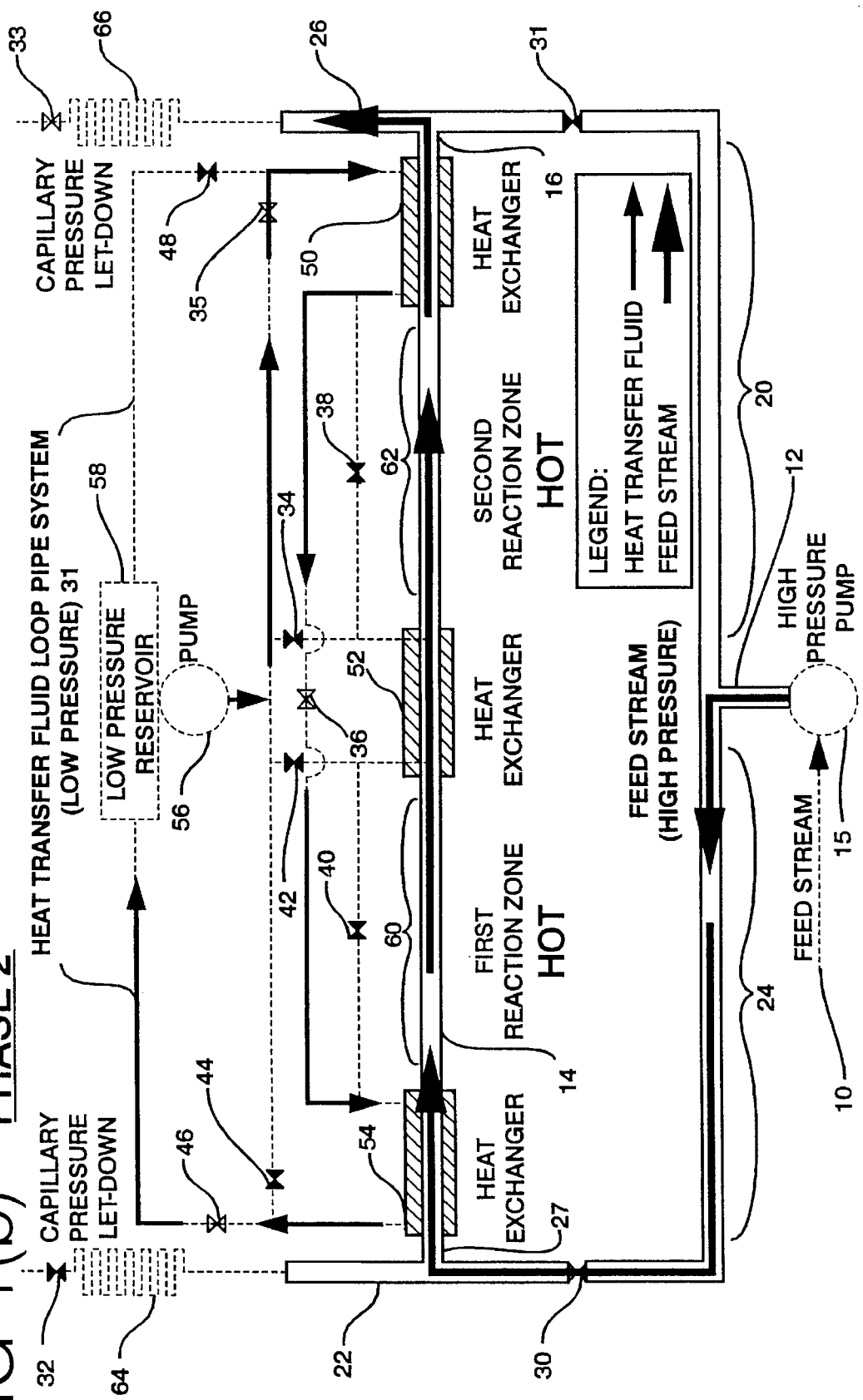

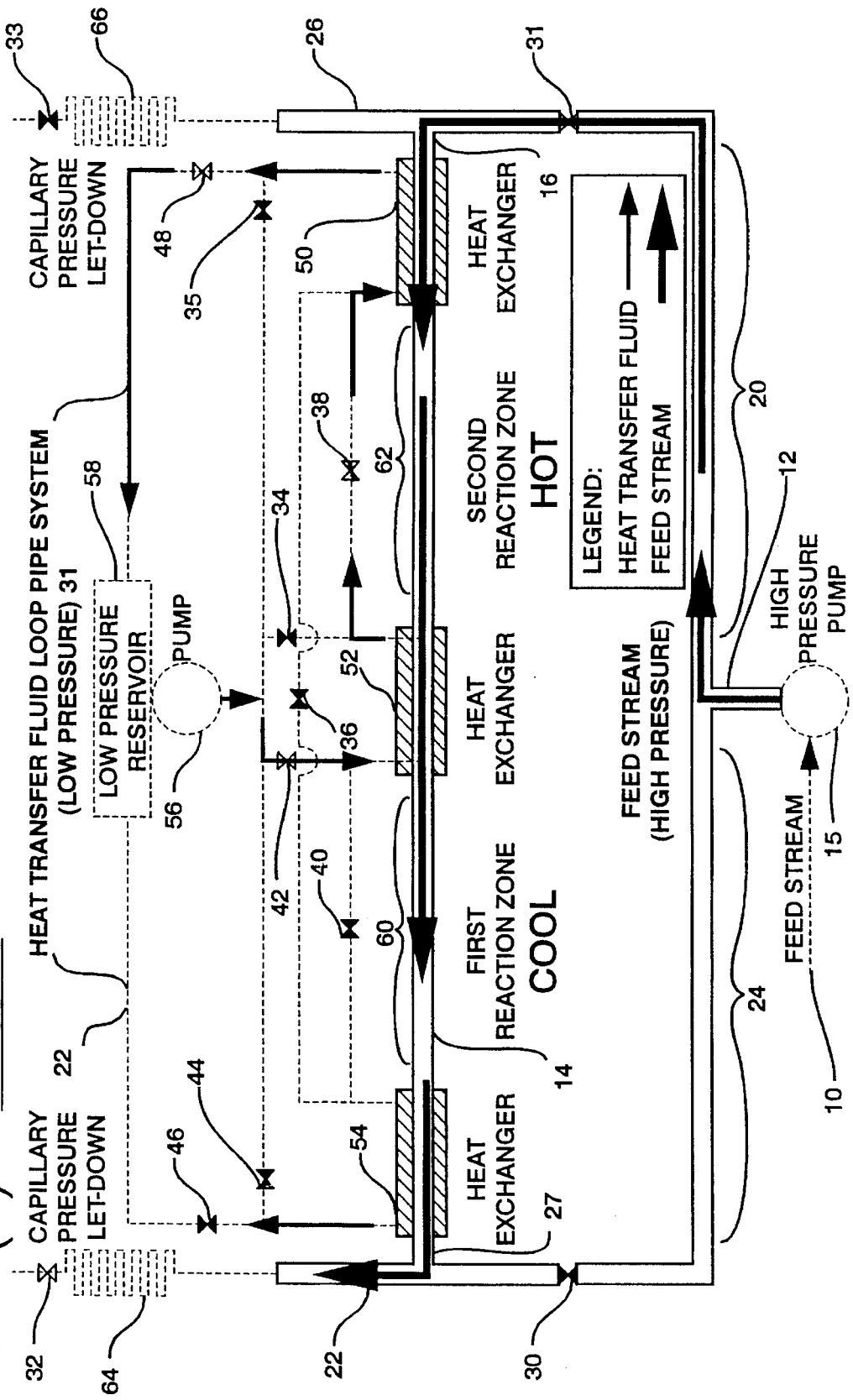
FIG-1(C) - PHASE 3

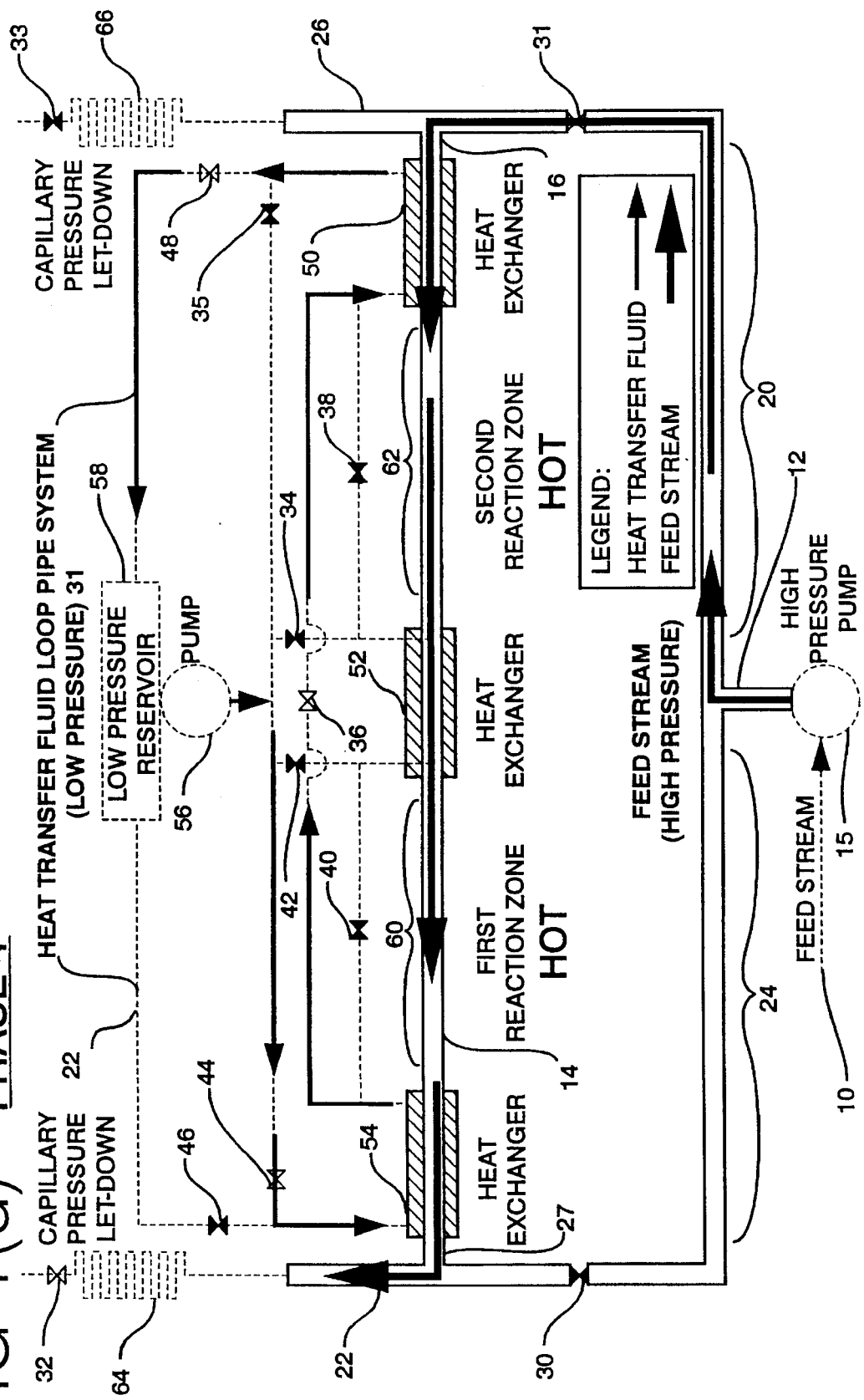

5,560,823

REVERSIBLE FLOW SUPERCRITICAL REACTOR AND METHOD FOR OPERATING SAME

FIELD OF THE INVENTION

This invention relates to supercritical water oxidation reactors and to a reversible flow supercritical reactor and method for operating same.

BACKGROUND OF THE INVENTION

Organic compounds in an aqueous stream can be oxidized to carbon dioxide and water using several methods. One well know method is Wet Air Oxidation (WAO) or the Zimmerman process (U.S. Pat. No. 2,665,249). According to this process, an organic material and an oxidizing agent, frequently air or pure oxygen, are heated in a pressurized reactor so that the reaction temperature remains below the critical temperature of water (about 374° C.) and the pressure is in the range of about 1500 to 2500 psi. At these temperatures and pressures both a liquid and a gas phase are present. Residence times of 0.5 to 1.0 hours result in oxidation of 70% to 95% of the organic compounds in the waste stream.

If more complete oxidation of the organic compounds is sought, the oxidation may be carried out under supercritical conditions for the aqueous stream (typically a temperature greater than 374° C. and a pressure greater than 3200 psia). This process, known as Supercritical Water Oxidation (SCWO), typically requires residence times of a few seconds to a few minutes and can result in the oxidation of more than 99% of the organic compounds present.

Water under supercritical conditions forms a single fluid phase having quite different characteristics from water in a liquid-gas two phase system of the type which exists under subcritical conditions. For example, subcritical water is a poor solvent for non-polar materials (including many organic materials) and a good solvent for polar materials (including many inorganic materials). However, at and above the critical point of water many organic compounds become readily soluble in water and many inorganic compounds become insoluble.

For example, at 25° C. benzene is sparingly soluble in water (0.07 weight percent). However, under supercritical conditions, benzene and water are completely miscible in all proportions (Connolly, J., "Solubility of Hydrocarbons in Water Near the Critical Solution Temperature", J. Chem Eng. Data 11(1), 13 (1966)).

Sodium chloride (NaCl) has a solubility of about 37 weight percent (370,000 ppm) under subcritical conditions at 300° C. and about 120 ppm under supercritical conditions of 550° C. and 25 MPa (Pitzer, K. S. and R. T. Pabalan, "Thermodynamics of NaCl in Steam", Gechim. Cosmochim. Acta 50, 1445 (1986)).

Calcium chloride ($CaCl_2$) has a maximum solubility of 70 weight percent at subcritical temperatures and 3 ppm at 500° C. and 25 MPa (Martynova, O. I., "Solubility of Inorganic Compounds in Subcritical and Supercritical Water", in High Temperature, High Pressure Electrochemistry in Aqueous Solutions, D. de G. Jones and R. W. Staehle, eds. Houston: National Association of Corrosion Engineers, (1976))

Oxygen is also completely miscible with water under supercritical conditions (Japas, M. L., and E. U. Franck, "High Pressure Phase Equilibria and PVT Data of the Water—Oxygen System Including Water-Air to 673° K. and 250 MPa", Ber. Bunsenges Phys. Chem 89, 1268 (1985)).

The fact that oxygen and many organics are completely miscible with water under supercritical conditions means that they come into intimate contact in a single phase contributing to very rapid oxidation reactions.

However, the insolubility of many inorganic compounds under supercritical conditions results in a serious scaling problem, with inorganic precipitates fouling surfaces and valves inside, and downstream of, the reactor, which is one of the problems to which this patent is directed.

The environment in an SCWO reactor can also be a reactive and corrosive one because of the presence of oxygen and the relatively high temperatures employed. Organic chlorine compounds produce chloride ions which are very reactive, and corrosive to metal surfaces, at supercritical temperatures.

U.S. Pat. No. 2,944,396 to Barton and Zimmerman et al. describes "vapour phase" oxidation of organic compounds in an aqueous stream. It describes an improvement to the wet air oxidation process of Zimmerman wherein a second oxidation stage is added. The effluent vapours from the wet air oxidation process are oxidized in a second reactor under conditions of 842° F. to 1034° F. (column 5, lines 40–53) and pressures from 800 to 6,500 psi, which pressure range encompasses both subcritical and supercritical conditions. The result is substantially complete combustion of all organics (column 5, line 60).

More recently, supercritical water oxidation processes have been disclosed which directly treat organic compounds in an aqueous stream without a prior wet air oxidation step. U.S. Pat. No. 4,292,953 to Dickinson discloses the supercritical water oxidation of a carboniferous fuel to produce thermal, mechanical or electrical energy. Dickinson notes that if the salt concentration is too high, it can result in scaling of the reactor or scaling or plugging in down stream heat exchange equipment (column 6, lines 33–47).

U.S. Pat. No. 4,338,199 (Modell No. 1) and U.S. Pat. No. 4,543,190 (Modell No. 2) disclose the use of supercritical water oxidation to oxidize, and thereby destroy, toxic organic compounds and to produce useful energy.

According to the disclosure of these patents, the insolubility of many inorganic salts under supercritical conditions means that supercritical water oxidation can be used to desalinate sea water and brine. If the aqueous stream containing the organics is sea water or brine, under supercritical conditions salt precipitates out of the single fluid phase almost immediately, thus enabling desalination in a rapid and continuous process (Modell No. 1, column 2, lines 58–63). The patents note that inorganic material may tend to build up on the walls of the reactor causing hot spots with subsequent destruction of the reactor walls (Modell No. 1, column, lines 8–23).

The scaling problem resulting from the insolubility of inorganic compounds at supercritical conditions has been a major impediment to the commercialization of supercritical water oxidation. Many waste streams containing organic compounds also contain inorganic salts in concentrations sufficient to cause severe scaling under supercritical conditions resulting in frequent reactor shutdowns for descaling.

A number of attempts have been made to solve the scaling problem. U.S. Pat. No. 4,822,497 (Hong et al.) discloses a method of conducting supercritical water oxidation wherein the reactor has a supercritical temperature zone in the upper region of the reactor and a lower temperature zone in the lower region of the reactor which has a liquid phase. The supercritical water oxidation occurs in the upper region. Precipitates and other solids from the oxidized supercritical temperature zone are transferred to the lower temperature zone so as to produce a solution or slurry. The solution or slurry is then removed from the reactor.

U.S. Pat. No. 5,100,560 (Huang) discloses an alternate method for dealing with the scaling problem in the reactor. According to this disclosure, the reactor once again has a supercritical temperature zone and a lower temperature zone. At least a portion of the inner wall of the pressure vessel bounding the supercritical temperature zone is scraped so as to dislodge at least a substantial portion of any solids which may be deposited thereon.

PCT published application PCT/US92/05320 (Modell No. 3) describes a method for oxidizing organic compounds under supercritical conditions in an elongate tube reactor. The reaction mixture of organic material is passed through the reactor at a velocity sufficient to minimize settling of a substantial portion of the inorganic materials present in the reaction mixture or formed under supercritical conditions. The outlet end of the reactor is cooled to rapidly form a two phase system in the reaction mixture. Inorganic salts substantially redissolve in the liquid phase of the cooled reaction mixture to minimize scaling problems.

The methods describe above all have limitations and none are reported in commercial use at this time. Barton et al discloses a process wherein essentially no inorganic materials are present in the effluent vapour being oxidized under supercritical conditions. Hong et al. discloses operating a reactor to have both a supercritical zone and a subcritical zone. Hong et al does not contain any example to show that both zones could be maintained in an operating reactor. Huang discloses scraping the inner surface of the supercritical zone of the reactor of Hong et al to prevent scale build-up. However, Huang discloses that scale build-up does occur and the mechanical action disclosed in Huang would be difficult to operate in practice and would result in a decreased lifetime of the reactor. Modell No. 3 describes high velocity throughput to achieve some reduction in reactor scaling and supplementary descaling, for example by brushes, high velocity sprays and the use of filters.

Accordingly, while supercritical water oxidation has considerable potential for the treatment of many types of effluent, no solution has yet been developed to the scaling problem which arises from the insolubility of inorganic materials in the supercritical region.

SUMMARY OF THE INVENTION

Copending application Ser. No. 08/255,070, which is incorporated herein by reference, describes a method and apparatus for the supercritical water oxidation of an aqueous stream containing organic materials and inorganic materials which form scale under supercritical conditions. The method consists of alternately supplying an aqueous feed stream and oxidant, under supercritical conditions, and a flushing stream, under subcritical conditions, to a supercritical reactor. The flushing stream dissolves inorganic scale built up in the reactor during the supercritical water oxidation reaction.

Copending application Ser. No. 08/255,070, also describes a method of continuous operation employing two reactors in which, alternately, the subcritical effluent from one reactor is cooled and used to flush a second, non-operating supercritical reactor.

The present invention provides a reversible flow reactor having two reaction zones which are alternately used for supercritical water oxidation while the remaining reaction zone is flushed with subcritical effluent from the active reaction zone.

The present invention also provides a simplified reactor design capable of continuous operation which eliminates the need to expose any valves to the hostile and corrosive effects of oxygen in supercritical water.

The present invention further provides a simplified reactor design in which a self-contained low pressure heat exchange system is used to transfer heat to and from the reactor and between reactions zones in the reactor.

The present invention additionally provides a simplified reactor design which eliminates the need to expose any individual valves to both subcritical and supercritical water and the range of temperatures which that would require. One aspect of the present invention provides a reversible flow supercritical water oxidation reactor for oxidizing an aqueous feed stream having a reactor for the supercritical water oxidation of organic compounds having first and second reaction zones connected in series, and through which an aqueous feed stream to be oxidized can be passed in either direction, and a self-contained heat exchange fluid system for allowing supercritical and subcritical temperatures to be maintained in either reaction zone.

Another aspect of the invention provides a reversible flow supercritical water oxidation reactor as described in which the reactor is a pipe reactor.

A further aspect of the invention provides a reversible flow supercritical water oxidation reactor as described in which the heat exchange fluid system comprises a heat exchange fluid reservoir, heat exchangers defining at least 3 heat exchange zones along said reactor, and further defining said reaction zones, and means to allow heat exchange fluid from said reservoir to be transferred to and from and between each of said heat exchangers.

A further aspect of the invention provides a reversible flow supercritical water oxidation reactor as described in which the heat exchange fluid is at low pressure.

The invention further provides a method of supercritically oxidizing an aqueous feed stream containing organic compounds by supplying an aqueous feed stream containing organic compounds and an oxidant to a first reaction zone in a reactor having first and second reaction zones connected in series and transferring heat using a self-contained heat exchange fluid system so as to maintain supercritical conditions in said first reaction zone and subcritical conditions in said second reaction zone to dissolve inorganic scale in said second reaction zone. Then, periodically, reversing the flow of the feed stream through said reactor by supplying the feed stream to said second reaction zone and transferring heat using a self-contained heat exchange fluid system so as to maintain supercritical conditions in said second reaction zone and subcritical conditions in said first reaction zone to dissolve inorganic scale in said first reaction zone.

The invention further provides the method just described in which the reactor is a pipe reactor.

The invention additionally provides a method as described in which in which the self-contained heat exchange fluid system comprises a heat exchange reservoir, heat exchangers defining at least 3 heat exchange zones along said reactor and defining said reaction zones and means to allow heat exchange fluid from said reservoir to be transferred to and from and between each of said heat exchangers.

BRIEF DESCRIPTION OF THE DRAWINGS

FIG. 1(a) is a schematic view of a first operating phase of a supercritical reactor of the present invention;

FIG. 1(b) is a schematic view of a second operating phase of a supercritical reactor of the present invention;

FIG. 1(c) is a schematic view of a third operating phase of a supercritical reactor of the present invention and;

FIG. 1(d) is a schematic view of a fourth operating phase of a supercritical reactor of the present invention shown.

DESCRIPTION OF THE PREFERRED EMBODIMENTS

The present invention provides a reversible flow supercritical reactor capable of operation in first and second directions and having first and second reaction zones. When the reactor is operating in a first direction supercritical water oxidation occurs in the first reaction zone and subcritical effluent from the first reaction zone is used to flush, and descale the second reaction zone. When the reactor is operating in the second direction supercritical water oxidation occurs in the second reaction zone and the first reaction zone is flushed, and descaled, by subcritical effluent from the second reaction zone. A self-contained heat exchange system is used to transfer heat to and from the reactor and between reaction zones in the reactor to maintain subcritical and supercritical conditions in each reaction zone. A preheat phase is used to heat each reaction zone prior to the commencement of supercritical water oxidation in each reaction zone.

FIG. 1(a) to 1(d) show the four operating phases of an embodiment of the invention. The four figures are identical except for the status of the valves (open or closed) which effect the flow of the feed stream through the reactor and the flow of the heat exchange medium through the heat exchange system.

In FIG. 1(a) an aqueous feed stream to be treated is generally designated by reference numeral 10 and is pressurized by high pressure pump 15 to form pressurized feed stream 12. The feed stream 10 contains organic materials oxidizable under supercritical conditions and may contain one or more inorganic materials including salts and salt precursors such as calcium chloride, calcium sulfate, sodium carbonate, sodium chloride, sodium sulphide, potassium sulfate, sodium phosphate and sodium sulphate.

The aqueous feed stream 10 may also contain metals, such as transitions metals, heavy metals, rare earth metals, metal oxides and metal carbonates.

The aqueous feed stream 10 may be any waste or effluent stream containing organic compounds including those resulting from industrial or commercial activities such as the manufacture of pulp and paper, chemicals, pharmaceuticals, foodstuffs and textiles.

The pressure of the pressurized feed stream 12 is typically in the range of 3,000 to 4,500 psi but may be higher. Pressurization of the feed stream may be accomplished by any means known in the art including a high pressure piston pump or diaphragm pump.

The pressurized feed stream contains an oxidant which may be added at any stage before the pressurized feed stream enters the reactor 14 or in the reactor 14 itself. This may be done by any conventional method known to those skilled in the art. For example, the oxidant may be stored in a storage vessel and fed to pressurized feed stream 12 via an oxidant stream. The oxidant is preferably at a pressure slightly higher, at least, than the pressure of the pressurized feed stream.

In alternate embodiments, the oxidant may be added to the feed stream 10 prior to pressurization.

The oxidant may be any of those which are known in the art of oxidation, including, but not limited to, hydrogen peroxide, sodium peroxide, compressed air, liquid oxygen, compressed oxygen and mixtures thereof.

FIG. 1(a) generally shows a reversible flow supercritical reactor comprising two self-contained fluid loops operating in a first phase of a four phase operational cycle.

An aqueous feed stream oxidation loop at high pressure is generally defined by high pressure pipe segments 20, 22, 24 and 26 and reactor 14. High pressure pipe segments 22 and 26 terminate at capillary pressure let down systems 64 and 66 respectively. Valves 30,31,32 and 33 control the direction of flow of the pressurized feed stream 12 through the reactor 14.

A heat transfer fluid loop at low pressure is generally defined by heat transfer fluid loop pipe system 31 and connected heat exchangers 50, 52 and 54. Valves 34,35,36, 38,40,42,44,46,48 control the movement of the heat transfer fluid to and from the heat exchangers 50, 52 and 54 to allow heat to be transferred to and from different parts of the reactor 14. Heat can also be transferred to or from the reactor as a whole by using an outside heat source or sink (not shown) connected to the heat transfer fluid loop.

FIG. 1(a) shows the reactor operated in a first direction. The feed stream 10 is pressurized by high pressure pump 15 to form pressurized feed stream 12. Pressurized feed stream 12 is shown travelling (arrows) through high pressure pipe segments 24 and 22 to reactor port 27. Valves 31 and 32 are closed and valves 30 and 33 are open. The temperature of the pressurized feed stream 12 is raised by heat exchanger 54 and, if oxidant is present in the pressurized feed stream 12, adiabatically by the heat released during oxidation. The combined effect of the adiabatic heat of reaction and the heat added by the heat exchanger 54 is to raise the temperature of the pressurized feed stream 12 to above the critical temperature of the feed stream so that supercritical water oxidation of organic compounds present in the feed stream occurs in first reaction zone 60.

The reactor 14 may be any type of vessel, pipe or other reactor known in the art which is capable of maintaining structural integrity at elevated temperatures and pressures. The residence time of the heated pressurized feed stream 12 in the first reaction zone 60 is sufficient to allow the supercritical water oxidation reaction to proceed substantially to completion. If there is a stoichiometric excess of oxidant present then, in many cases, greater than 99% oxidation of the organic compounds in the pressurized feed stream 16 can often be achieved. Generally, due to the rapid nature of supercritical water oxidation, a residence time of one minute or less is sufficient.

The term supercritical conditions as used herein refers to those conditions which will result in supercritical water oxidation of the feed stream. Such conditions are well known in the art and generally involve temperatures higher than 374° C. and pressures above 3200 psi.

The supercritical water oxidation of the organic material that has commenced as the pressurized feed stream is heated on entering the first reaction zone 60 generally produces sufficient heat adiabatically to raise the temperature of the contents of the first reaction zone 60 above the critical temperature so that supercritical conditions are achieved in the first reaction zone 60. If the adiabatic heat of reaction is insufficient to raise the temperature above the critical temperature then additional heat can be added via heat exchanger 54 or adding an additional fuel source such as oil or gas to the aqueous stream.

Preferably, the contents of the first reaction zone 60 are raised to a temperature from about the critical temperature of the pressurized feed stream, which may be as low as 374° C., to about 800° C., more preferably from about 374° C. to about 700° C. and most preferably to about 450° C. to 650° C.

The heat transfer fluid loop pipe system 31 is a self-contained low pressure system of connected loops used to heat the pressurized feed steam 12 and to remove and recycle heat generated by supercritical water oxidation of the pressurized feed stream 12. FIG. 1(a) shows heat transfer fluid in low pressure reservoir 58 pumped by pump 56. Valves 34, 40 and 46 are open while the remaining valves in the heat transfer fluid loop system are closed. The result is that heat transfer fluid flows to heat exchanger 52 where heat generated during supercritical water oxidation in first reaction zone 60 is removed from the pressurized feed steam 12 and transferred via open valve 40 to heat exchanger 54 to heat the incoming pressurized feed stream 12. Preferably sufficient heat is removed by heat exchanger 52 to reduce the temperature of the pressurized feed stream 12 to below the critical point. The heat transfer fluid then proceeds via open valve 46 to the low pressure reservoir 58. The direction of heat transfer fluid flow in heat exchanger system 31 is shown by the arrows in FIG. 1(a).

The heat exchangers 50, 52 and 54 shown in FIG. 1(a) are heat exchange shells which surround portions of the reactor 14 to generally define heat exchange zones in the reactor where heat exchange between the reactor and the heat transfer fluid loop pipe system 31 can occur. The heat exchange zones then loosely define reaction zones between the heat exchange zones. There is of course no physical boundary in the reactor between these zones and they are referred to here solely for convenience in discussing the operation of the reactor.

Once the temperature of the contents of the first reaction zone 60 exceeds the critical temperature of the pressurized feed stream 12, the inorganic compounds, including salts, in the pressurized feed stream 12 will precipitate out of solution and tend to stick to the walls of the first reaction zone 60 as inorganic scale.

The supercritical water oxidation reaction products, which are primarily superheated water and carbon dioxide, exit the first reaction zone 60, pass through heat exchanger 52 where they are cooled to a subcritical temperature, and flow into the second reaction zone 62 as a subcritical flushing stream 28. The heat generated by the supercritical reaction in the first reaction zone is removed and recycled by heat exchanger 52. The subcritical flushing stream 28 dissolves any inorganic scale on the walls of reactor 14 in the second reaction zone and generally downstream of heat exchanger 52.

The subcritical flushing stream 28 exits through capillary pressure let-down 66 where it may be further treated if necessary to remove dissolved inorganics and the like by conventional means. It will be appreciated by those skilled in the art that other methods of pressure let down may be employed instead of capillary pressure let-down. Positive back pressure (not shown) using clean water may be maintained between valve 31 and capillary pressure letdown 66 to prevent any possible contamination of the now substantially organic free (>99%) flushing stream by pressurized feed stream 12 in high pressure pipe segment 20.

The build-up of inorganic scale on the interior of the first reaction zone 60 eventually obstructs the flow of the pressurized feed stream 12 through the first reaction zone 60 thereby reducing throughput and interferes with heat transfer through the first reaction zone walls making it difficult to control conditions in the first reaction zone and accelerating corrosion of the first reaction zone walls.

In accordance with the present invention, the inorganic scale on the interior of the first reaction zone is removed by operating the reactor in a second direction as shown in FIG. 1(c) wherein the direction of flow of the pressurized feed stream 12 through the reactor is reversed. This is the third phase of the operational cycle. However, the reactor must first proceed to a second operational phase (shown in FIG. 1(b)) in which the second reaction zone is pre-heated to avoid the incomplete oxidation which may occurr if the feed stream is switched immediately to enter the relatively cool second reaction zone through port 16.

The only change between FIG. 1(a) and FIG. 1(b) is in the valves in the heat transfer fluid loop pipe system 31. Valves 35, 36 and 46 are open and the remaining valves in the heat transfer fluid loop pipe system 31 are closed so that the heat transfer fluid travels first to heat exchanger 50 to cool the, now oxidized, pressurized feed stream 12 to form a subcritical flushing stream 28, and then to heat exchanger 54 to preheat the pressurized feed stream 12. The effect of this change is that the oxidized feed stream 12 from the first reaction zone passes through heat exchanger 52 without being cooled and therefore heats the second reaction zone in preparation for the third phase of the reactor cycle. The oxidized feed stream 12 is then cooled in heat exchanger 50 and passes to capillary pressure let-down 66 and further treatment to remove dissolved inorganics if necessary. Second phase operation seldom requires more than a few minutes to achieve sufficient preheating of the second reaction zone 62.

FIG. 1(c) as mentioned shows a third operational phase in which the direction of flow of the pressurized feed stream 12 through the reactor is reversed. This is achieved by closing valves 30 and 33 and opening valves 31 and 32. When operated in this second direction, the pressurized feed stream 12 enters the reactor 14 through port 16 and enters into the second reaction zone 62.

For operation in this second direction, the direction of flow in the heat transfer fluid loop pipe system 31 is also changed as shown in FIG. 1(c) by small arrows. This is done by opening valves 42, 38 and 48 and closing the remaining valves. In third phase operation, the incoming pressurized feed stream 12 enters reactor 14 through port 16. Oxidant as discussed previously is added to the pressurized feed stream 12 and adiabatic heat of oxidation and heat from heat exchanger 50 combine to raise the temperature of the pressurized feed stream 12 to above its critical temperature. supercritical water oxidation occurs in second reaction zone 62 as generally described in connection with first phase operation. The products of reaction, oxidized feed stream 12 have heat removed by heat exchanger 52 to reduce the temperature below the critical temperature and form subcritical flushing stream 28. Subcritical flushing stream 28 flushes first reaction zone 60, and inorganic scale dissolved, generally as described in connection with first phase operation. The subcritical flushing stream 28 then passes to capillary let-down as previously described.

The subcritical flushing stream 28 in first and third phase operation is, as the name suggests, subcritical in temperature. The specific temperature is not essential and will depend on system heat balance consideration. It should, however, be kept high enough to promote the dissolution of inorganic precipitates and scale, and usually a temperature in the range of 300° to 360° C. will be satisfactory. The time required to dissolve the inorganic precipitates and scale in the first reaction zone will depend on the characteristics of the reactor (type, diameter, throughput rate, etc) and the solubility of the precipitate.

FIG. 1(d) shows a fourth operational phase in which the first reaction zone 60 is preheated in preparation for first phase operation. This is achieved by opening valves 44,36 and 48 in the heat transfer fluid loop system, and closing the remaining valves in the heat transfer fluid loop sytem, so that heat exchanger 54 cools the oxidized feed stream 12 to form subcritical flushing stream 28 and heat exchanger 50 preheats the pressurized feed stream 12. Once the first reaction zone has been preheated the reactor can go to first phase operation as previously described.

The extent to which the throughput of the reactor is obstructed by scaling can be readily determined by, for example, measuring the pressure drop across the reactor during operation. The pressure drop will increase as scaling obstructs fluid flow through the reactor.

It is an advantage of the continuous reverse flow supercritical reactor of the present invention that the reactor may be continuously operated without the need to shut the reactor down to remove the accumulated scale and precipitate inorganic.

It is a further advantage of the invention that the reactor itself may simply be formed from a single pressure vessel, such as a continuous high pressure pipe and that no valves in the feed stream oxidation loop are exposed to the corrosive environment of heated, high pressure supercritical water and oxidant. It will be readily appreciated that such exposure will significantly reduce valve life and requires more expensive valves. Further, none of the valves are exposed to the ranges of temperature that can occur if both subcritical and supercritical water are cycled through a single valve. The reactor of the invention also requires relatively few high pressure welds because the number of valves in the feed stream loop is kept to a minimum, namely two.

It is a still further advantage of the present invention that the heat exchange system is separate from the feed stream in the reactor. Accordingly, the heat exchange system may be maintained at low pressures and may be manufactured from inexpensive materials, which are not required to be resistant to the corrosive feed stream. Similarly, valves in the heat exchange system are not exposed to the corrosive feed stream. Heat exchange efficiency can be readily controlled, for example, by changing the rate of fluid pumping or by adding a cooling loop or heat source to the system.

It will be appreciated by those skilled in the art that many variations on the specific embodiments disclosed herein, including reactors having more than two reaction zones, are possible without departing from the spirit or scope of the invention disclosed and claimed herein.

We claim:

1. A reversible flow supercritical water oxidation reactor for oxidizing an aqueous feed stream comprising:

a) a reactor for the supercritical water oxidation of organic compounds, said reactor having a first end and a second end and having first and second reaction zones therebetween connected in series through which an aqueous feed stream to be oxidized can be passed in either direction;

b) a self-contained heat exchange fluid system for allowing supercritical and subcritical temperatures to be maintained alternatively in either reaction zone, wherein said heat exchange fluid system comprises a heat exchange fluid reservoir and heat exchangers defining at least three heat exchange zones between said first and second ends of said reactor; and means for directing heat exchange fluid between said heat exchange zones whereby preheating of incoming aqueous feed steam occurs alternately at either of said first and second ends of said reactor and whereby supercritical conditions occur at the one of said first and second reaction zones that is immediately downstream of said end of said reactor at which said preheating occurs and the other of said reaction zones is operated at subcritical conditions, wherein said supercritical and subcritical conditions are achieved by said means for directing heat exchange fluid and wherein said first and second reaction zones are separated by one of said heat exchange zones.

2. The reversible flow supercritical water oxidation reactor of claim 1 in which the reactor is a pipe reactor.

3. The reversible flow supercritical water oxidation reactor of claim 1 which the heat exchange fluid is at low pressure.

4. The reversible flow supercritical water oxidation reactor of claim 1 in which the heat exchangers are shells in contact with the reactor.

* * * * *

UNITED STATES PATENT AND TRADEMARK OFFICE
CERTIFICATE OF CORRECTION

PATENT NO. : 5,560,823
DATED : October 1, 1996
INVENTOR(S) : Whiting

It is certified that error appears in the above-indentified patent and that said Letters Patent is hereby corrected as shown below:

At column 10, line 27, "feed steam" should read --feed stream--.

Signed and Sealed this

Nineteenth Day of August, 1997

Attest:

BRUCE LEHMAN

Attesting Officer

Commissioner of Patents and Trademarks